(12) United States Patent
Wang et al.

(10) Patent No.: US 11,945,499 B2
(45) Date of Patent: Apr. 2, 2024

(54) METHOD AND APPARATUS FOR TRAILER ANGLE MEASUREMENT AND VEHICLE

(71) Applicant: Beijing Tusen Zhitu Technology Co., Ltd., Beijing (CN)

(72) Inventors: Yuyong Wang, Beijing (CN); Pingyuan Ji, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 461 days.

(21) Appl. No.: 17/210,447

(22) Filed: Mar. 23, 2021

(65) Prior Publication Data
US 2021/0291902 A1    Sep. 23, 2021

(30) Foreign Application Priority Data
Mar. 23, 2020 (CN) .......................... 202010208549.5

(51) Int. Cl.
*B62D 15/02* (2006.01)
*G01S 7/53* (2006.01)
(Continued)

(52) U.S. Cl.
CPC .............. *B62D 15/021* (2013.01); *G01S 7/53* (2013.01); *G01S 17/88* (2013.01); *G06F 17/11* (2013.01)

(58) Field of Classification Search
CPC ......... B62D 15/021; G01S 7/53; G01S 17/88; G06F 17/11
See application file for complete search history.

(56) References Cited

U.S. PATENT DOCUMENTS

| 9,279,662 B2* | 3/2016 | Steffey | ................... G02B 26/10 |
| 2022/0026920 A1* | 1/2022 | Ebrahimi Afrouzi | .. G06N 3/045 |

(Continued)

FOREIGN PATENT DOCUMENTS

| CN | 108278981 A | 7/2018 |
| CN | 108761481 A | 11/2018 |

(Continued)

OTHER PUBLICATIONS

Chinese Application No. 202010208549.5, First Office Action dated Oct. 10, 2022, pp. 1-64.

(Continued)

*Primary Examiner* — John Kwon
(74) *Attorney, Agent, or Firm* — Perkins Coie LLP

(57) ABSTRACT

The present disclosure relates to autonomous vehicle technology, and provides a method and an apparatus for trailer angle measurement, as well as a vehicle. With the present disclosure, it can be determined whether to use a single-beam lidar or a multiple-beam lidar for trailer angle measurement based on an initial trailer angle. When it is determined to use the multiple-beam lidar a deflection direction of the semi-trailer can be obtained, and laser light emitted by the multiple-beam lidar on a side of the deflection direction and reflected by a trailer surface can be collected. A coordinate transformation and selection process can be applied on the laser point cloud to form a candidate point cloud. A boundary straight line of the trailer can be determined by means of optimized solution of the candidate point cloud. A trailer angle can be determined based on the boundary straight line of the trailer.

20 Claims, 10 Drawing Sheets

(51) Int. Cl.
*G01S 17/88* (2006.01)
*G06F 17/11* (2006.01)

(56) References Cited

U.S. PATENT DOCUMENTS

| | | | | |
|---|---|---|---|---|
| 2022/0051422 | A1* | 2/2022 | Parian | G06T 3/0068 |
| 2022/0066456 | A1* | 3/2022 | Ebrahimi Afrouzi | ......................... B25J 9/1697 |
| 2022/0187841 | A1* | 6/2022 | Ebrahimi Afrouzi | ......................... G05D 1/0242 |

FOREIGN PATENT DOCUMENTS

| | | |
|---|---|---|
| CN | 108873896 A | 11/2018 |
| CN | 109959352 A | 11/2018 |
| CN | 108873896 A | 3/2019 |
| CN | 109521403 A | 3/2019 |
| CN | 108278981 A | 7/2019 |
| CN | 109959352 A | 7/2019 |
| JP | 2001334966 A | 12/2001 |
| JP | 2002053082 A | 2/2002 |
| JP | 2002114176 A | 4/2002 |

OTHER PUBLICATIONS

Lin, Li et al. "Joint Calibration of 2D and 3D Vision Integrated Sensor System," Chinese Journal of Scientific Instrument, vol. 33, No. 11, Nov. 2012, pp. 1-7.
English translation of Office Action from corresponding Chinese Application No. 202010208549.5, dated Jan. 12, 2023 (12 pages).
Lin et al. "Joint calibration method of two-dimensional and three dimensional visual sensing integrated system" Journal of Instrument and Meter Science Chinese Journal, vol. 33, Issue 11, [Nov. 2012] (19 pages).

* cited by examiner

METHOD AND APPARATUS FOR TRAILER ANGLE MEASUREMENT AND VEHICLE

CROSS-REFERENCE TO RELATED APPLICATIONS

The present document claims priority under Paris Convention to Chinese Patent Application No. 202010208549.5, titled "METHOD AND APPARATUS FOR TRAILER ANGLE MEASUREMENT AND VEHICLE", filed on Mar. 23, 2020, the content of which is incorporated herein by reference in its entirety.

TECHNICAL FIELD

The present disclosure relates to autonomous vehicle technology, and more particularly, to a method and an apparatus for trailer angle measurement, as well as a vehicle.

BACKGROUND

Currently, with the development of the logistics transportation industry, vehicles with tractors and trailers (hereinafter referred to as semi-trailers), such as container trucks, are becoming increasingly popular. As a heavy transportation tool, a semi-trailer is more capable of improving overall economic benefits of road transportation than an ordinary truck. With the development of autonomous driving technology, a trailer angle (e.g., in FIG. 1 which is a top view of a semi-trailer, the trailer angle refers to the angle $\alpha$ between the central axis of the tractor 11 and the central axis of the trailer 12), as a basis for autonomous driving planning and control point, has become a focus of research.

At present, how to implement fast and accurate measurement of a trailer angle with a simple structure has become a problem to be solved.

SUMMARY

The embodiments of the present disclosure provide a method and an apparatus for trailer angle measurement, as well as a vehicle, capable of achieving fast and accurate measurement of a trailer angle with a simple structure.

In order to achieve the above object, the following technical solutions are provided according to the embodiments of the present disclosure.

In a first aspect of the embodiments of the present disclosure, a method for trailer angle measurement is provided. The method is applied in a semi-trailer including a tractor and a trailer. A single-beam lidar is provided at a rear part of the tractor, at least one multiple-beam lidar is provided on both sides of the tractor, and a laser reflection plate corresponding to a position of the single-beam lidar is provided at a head of the trailer. The method includes: obtaining an initial trailer angle; determining whether to use the single-beam lidar or the multiple-beam lidar for trailer angle measurement based on the initial trailer angle; obtaining, when it is determined to use the multiple-beam lidar for trailer angle measurement, a deflection direction of the semi-trailer, and collecting laser light emitted by the multiple-beam lidar on a side of the deflection direction and reflected by a surface of the trailer; applying a coordinate transformation and selection process on the laser point cloud to form a candidate point cloud; determining a boundary straight line of the trailer by means of optimized solution of the candidate point cloud based on a pre-constructed objective optimization function; and determining a trailer angle based on the boundary straight line of the trailer.

In a second aspect of the embodiments of the present disclosure, an apparatus for trailer angle measurement is provided. The apparatus is applied in a semi-trailer including a tractor and a trailer. A single-beam lidar is provided at a rear part of the tractor, at least one multiple-beam lidar is provided on both sides of the tractor, and a laser reflection plate corresponding to a position of the single-beam lidar is provided at a head of the trailer. The apparatus includes: an initial trailer angle obtaining unit configured to obtain an initial trailer angle; a measurement selecting unit configured to determine whether to use the single-beam lidar or the multiple-beam lidar for trailer angle measurement based on the initial trailer angle; a laser point cloud collection control unit configured to obtain, when it is determined to use the multiple-beam lidar for trailer angle measurement, a deflection direction of the semi-trailer and collect laser light emitted by the multiple-beam lidar on a side of the deflection direction and reflected by a surface of the trailer; a point cloud processing unit configured to apply a coordinate transformation and selection process on the laser point cloud to form a candidate point cloud; a trailer boundary straight line determining unit configured to determine a boundary straight line of the trailer by means of optimized solution of the candidate point cloud based on a pre-constructed objective optimization function; and a trailer angle determining unit configured to determine a trailer angle based on the boundary straight line of the trailer.

In a third aspect of the embodiments of the present disclosure, a vehicle is provided. The vehicle includes an apparatus for trailer angle measurement, a tractor, and a trailer. A single-beam lidar is provided at a rear part of the tractor, at least one multiple-beam lidar is provided on both sides of the tractor, and a laser reflection plate corresponding to a position of the single-beam lidar is provided at a head of the trailer. The apparatus for trailer angle measurement is communicatively connected to the single-beam lidar and each multiple-beam lidar, and configured to: obtain an initial trailer angle; determine whether to use the single-beam lidar or the multiple-beam lidar for trailer angle measurement based on the initial trailer angle; obtain, when it is determined to use the multiple-beam lidar for trailer angle measurement, a deflection direction of the semi-trailer, and collect laser light emitted by the multiple-beam lidar on a side of the deflection direction and reflected by a surface of the trailer; apply a coordinate transformation and selection process on the laser point cloud to form a candidate point cloud; determine a boundary straight line of the trailer by means of optimized solution of the candidate point cloud based on a pre-constructed objective optimization function; and determine a trailer angle based on the boundary straight line of the trailer.

In a fourth aspect of the present disclosure, a non-transitory computer readable storage medium is provided. The non-transitory computer readable storage medium includes a program or instructions which, when executed on a computer, cause the computer to perform the method for trailer angle measurement according to the above first aspect.

In a fifth aspect of the present disclosure, a computer program product is provided. The computer program product includes instructions. The computer program product, when executed on a computer, causes the computer to perform the method for trailer angle measurement according to the above first aspect.

In a sixth aspect of the present disclosure, a chip system is provided. The chip system includes a processor. The processor is coupled to a memory storing program instructions which, when executed by the processor, cause the processor to perform the method for trailer angle measurement according to the above first aspect.

In a seventh aspect of the present disclosure, a computing device is provided. The computing device includes a memory and one or more processors communicatively connected to the memory. The memory stores instructions executable by the one or more processors. The instructions, when executed by the one or more processors, cause the one or more processors to perform the method for trailer angle measurement according to the above first aspect.

The embodiments of the present disclosure provide a method and an apparatus for trailer angle measurement, as well as a vehicle, applied in a semi-trailer including a tractor and a trailer. A single-beam lidar is provided at a rear part of the tractor, at least one multiple-beam lidar is provided on both sides of the tractor, and a laser reflection plate corresponding to a position of the single-beam lidar is provided at a head of the trailer. As such, in the embodiments of the present disclosure, it can be determined whether to use a single-beam lidar or a multiple-beam lidar for trailer angle measurement based on an initial trailer angle. When it is determined to use the multiple-beam lidar for trailer angle measurement, a deflection direction of the semi-trailer can be obtained, and laser light emitted by the multiple-beam lidar on a side of the deflection direction and reflected by a surface of the trailer can be collected. A coordinate transformation and selection process can be applied on the laser point cloud to form a candidate point cloud. A boundary straight line of the trailer can be determined by means of optimized solution of the candidate point cloud based on a pre-constructed objective optimization function. A trailer angle can be determined based on the boundary straight line of the trailer. Therefore, the embodiments of the present disclosure can achieve fast and accurate measurement of a trailer angle with a simple structure.

BRIEF DESCRIPTION OF THE DRAWINGS

In order to describe the technical solutions according to the embodiments of the present disclosure or the prior art more clearly, figures used in description of the embodiments or the prior art will be introduced briefly below. Obviously, the figures described below only illustrate some embodiments of the present disclosure, and other figures can be obtained by those of ordinary skill in the art based on these drawings without any inventive efforts.

DETAILED DESCRIPTION OF THE EMBODIMENTS

Figure 1:
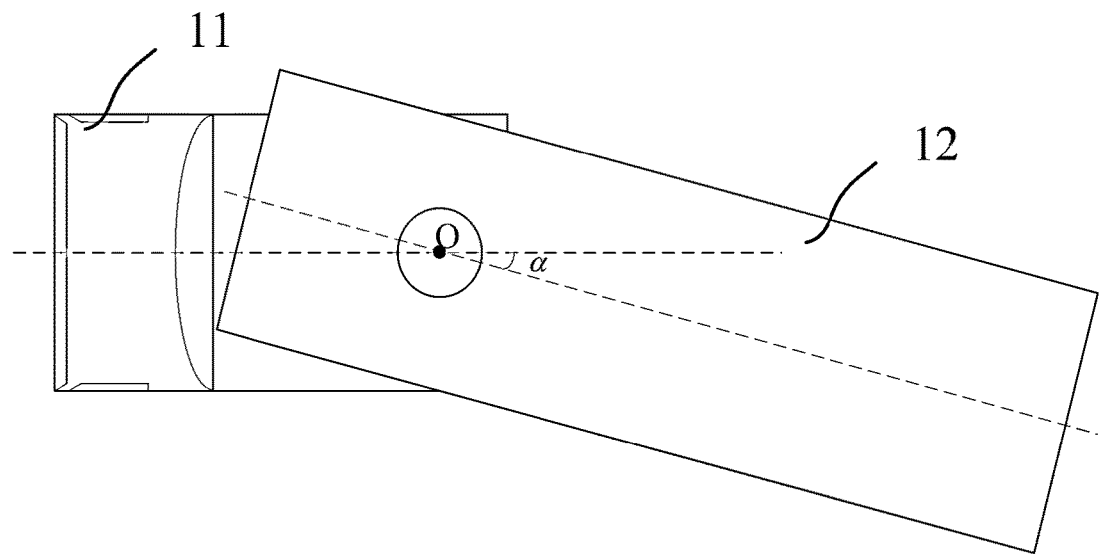
FIG. 1 is a schematic diagram showing a trailer angle according to an embodiment of the present disclosure.

In the following, the solutions according to the embodiments of the present disclosure will be described clearly and completely with reference to the figures. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

It is to be noted that the terms "first" and "second" in the description and claims of the present disclosure and the above-mentioned figures are used to distinguish similar objects from each other, and are not necessarily used to describe a specific sequence or order. It should be understood that the data used in this way can be interchanged as appropriate for the purpose of illustration of the embodiments of the present disclosure. In addition, the terms "comprising" and "having" and any variants thereof are intended to cover non-exclusive inclusions. For example, a process, method, system, product or device that includes a series of steps or units is not necessarily limited to those steps or units that are explicitly listed, and may include other steps or units that are not explicitly listed or are inherent to the process, method, product, or device.

In order to allow those skilled in the art to better understand the present disclosure, some of the technical terms used in the embodiments of the present disclosure are explained as follows:

Point cloud: A set of point data on an outer surface of an object as obtained by a measuring apparatus during reverse engineering is referred to as a point cloud.

IMU: Inertial Measurement Unit (IMU) is a device that measures a three-axis attitude angle (or angular rate) and acceleration of an object.

Frame: Measurement data received by a sensor in an observation. For example, one frame of data is an image for a camera, or a set of laser point clouds for a lidar.

In some embodiments of the present disclosure, the term "vehicle" is to be broadly interpreted in the present disclosure as including any moving objects, including for example aircraft, ships, spacecrafts, cars, trucks, vans, semi-trailers, motorcycles, golf carts, off-road vehicles, warehouse transport vehicles, agricultural vehicles, and vehicles running on tracks, such as trams or trains and other rail vehicles. A "vehicle" as used in the present disclosure may typically include: a power system, a sensor system, a control system, peripheral devices and a computer system. In other embodiments, a vehicle may include more, fewer, or different systems.

Here, the power system is a system that supplies power to the vehicle, including: an engine/motor, a transmission, wheels/tires, and a power source unit.

The control system may include a combination of devices that control the vehicle and its components, such as a steering unit, a throttle, and a brake unit.

The peripheral devices may be devices that allow the vehicle to interact with external sensors, other vehicles, external computing devices, and/or users, including e.g., a wireless communication system, a touch screen, a microphone, and/or a speaker.

Based on the vehicle described above, an autonomous vehicle can be further provided with a sensor system and an autonomous driving control device.

The sensor system may include a plurality of sensors for sensing information on an environment in which the vehicle is located, and one or more actuators that change respective positions and/or directions of the sensors. The sensor system may include any combination of sensors such as a Global Positioning System (GPS) sensor, an Inertial Measurement Unit (IMU), a Radio Detection and Ranging (RADAR) unit, a camera, a laser rangefinder, a Light Detection and Ranging (LIDAR) unit, and/or an acoustic sensor. The sensor system may further include sensors that monitor the vehicle's internal systems (such as an $O_2$ monitor, a fuel gauge, an engine thermometer, etc.).

The autonomous driving control device may include a processor and a memory having at least one machine executable instruction stored therein. The processor executes the at least one machine executable instruction to provide functions including e.g., a map engine, a positioning module, a perception module, a navigation or route module, and an autonomous control module. The map engine and the positioning module are configured to provide map information and positioning information. The perception module is configured to perceive objects in the environment around the vehicle based on information obtained by the sensor system and the map information provided by the map engine. The navigation or route module is configured to plan a driving route for the vehicle based on processing results from the map engine, the positioning module and the perception module. The autonomous control module is configured to convert decision information inputted from the modules such as the navigation or route module into a control command for outputting to a vehicle control system, and transmit the control command to respective components in the vehicle control system over an in-vehicle network (for example, an in-vehicle electronic network system implemented using a CAN bus, a local interconnection network, a multimedia directional system transmission, etc.) for autonomous control of the vehicle. The autonomous control module can also obtain information on respective components in the vehicle via the in-vehicle network.

Currently, solutions for trailer angle measurement in the related art can be divided into contact and contact-less solutions. The contact solutions, such as those based on the principle of magnetic induction, have strict requirements on installation scenarios. In terms of structure and detection accuracy, they are not suitable for scenarios where relative movements between the tractor head and the trailer are relatively irregular, and there are potential safety issues. The contact-less solutions typically use a single lidar for measurement, and have three main deficiencies. First, their detection range cannot meet the requirements of the application scenarios and cannot achieve full-angle coverage. Second, their generalization ability is insufficient and thus they require complicated preparation and cannot be rapidly adapted to various types of trucks. Third, their detection accuracy, output frequency, and robustness are not suitable for high-accuracy scenarios, such as autonomous reversing scenarios in port areas. In order to overcome the above problems, the present disclosure provides the following embodiments.

Figure 2:
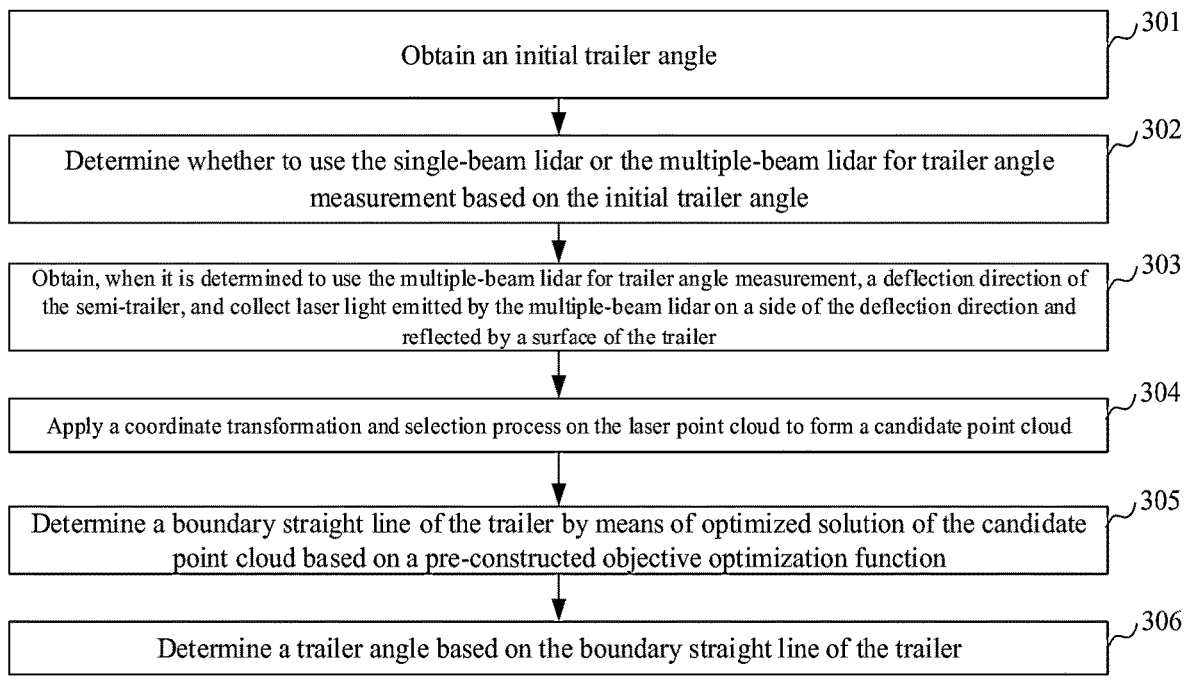
FIG. 2 is a first flowchart illustrating a method for trailer angle measurement according to an embodiment of the present disclosure.
Figure 3:
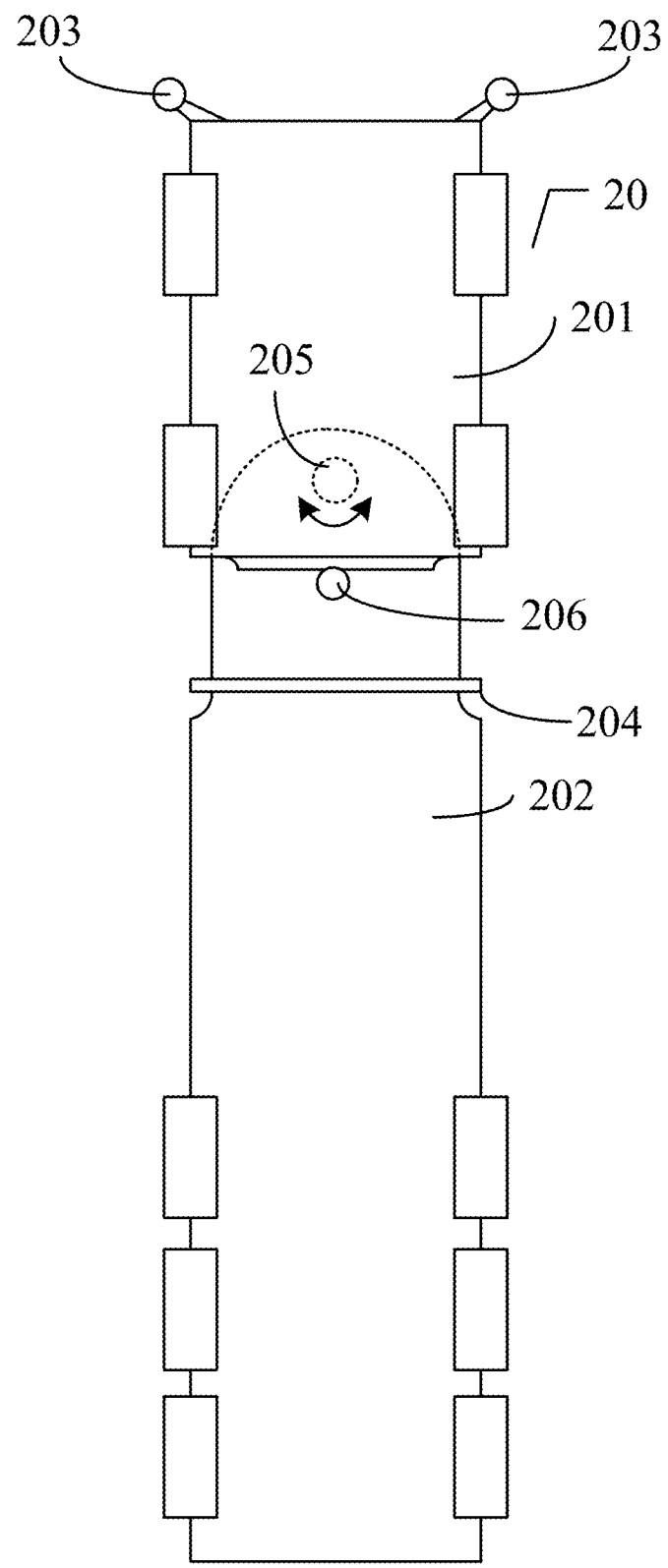
FIG. 3 is a schematic diagram showing a structure of a semi-trailer according to an embodiment of the present disclosure.

As shown in FIG. 2, an embodiment of the present disclosure provides a method for trailer angle measurement, which is applied to a semi-trailer 20 as shown in FIG. 3 (FIG. 3 is a bottom view of the semi-trailer 20). The semi-trailer 20 includes a tractor 201 and a trailer 202. The tractor 201 and the trailer 202 are connected by a shaft 205, such that the trailer 202 can rotate with respect to the tractor 201. On both sides of the tractor 201 (such as the left and right sides of the front part of the tractor 201, that is, the front face of the vehicle), at least one multiple-beam lidar 203 is provided (for example, one, two, or more multiple-beam lidars can be provided on each of the left and right sides, as shown in FIG. 3, which only shows one multiple-beam lidar on each of the left and right sides for the purpose of illustration). In addition, as shown in FIG. 3, a single-beam lidar 206 is provided at a rear part of the tractor 201, and a laser reflection plate 204 corresponding to a position of the single-beam lidar is provided at a head of the trailer 202.

As shown in FIG. 2, the method for trailer angle measurement includes the following steps.

At step 301, an initial trailer angle is obtained.

At step 302, it is determined whether to use the single-beam lidar or the multiple-beam lidar for trailer angle measurement based on the initial trailer angle.

At step 303, when it is determined to use the multiple-beam lidar for trailer angle measurement, a deflection direction of the semi-trailer is obtained, and laser light emitted by the multiple-beam lidar on a side of the deflection direction and reflected by a surface of the trailer is collected.

At step 304, a coordinate transformation and selection process is applied on the laser point cloud to form a candidate point cloud.

At step 305, a boundary straight line of the trailer is determined by means of optimized solution of the candidate point cloud based on a pre-constructed objective optimization function.

At step 306, a trailer angle is determined based on the boundary straight line of the trailer.

Figure 4:
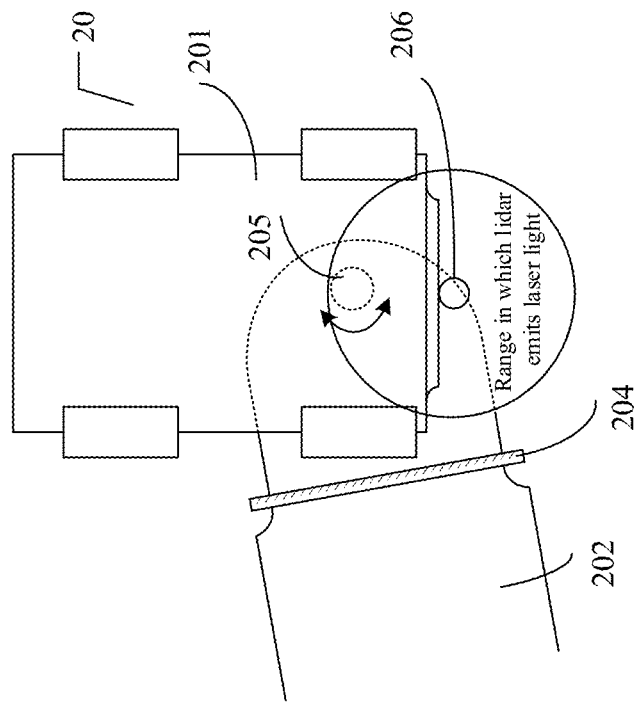
FIG. 4 is a first schematic diagram showing a scenario of lidar collection according to an embodiment of the present disclosure.
Figure 4:
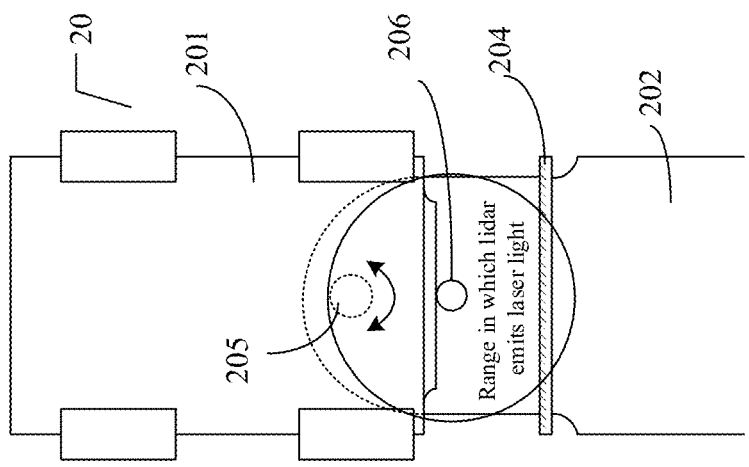

Since only one single-beam lidar 206 provided at the rear part of the tractor 201 can also emit laser light towards a reflective surface of the laser reflection plate 204. The single-beam lidar 206 may be generally sufficient for measurement of the trailer angle. However, in a scenario with a large trailer angle, as shown in FIG. 4, the laser reflection plate 204 may have moved to a side of the tractor 201 and entered a blind zone of the single-beam lidar 206, and the laser light emitted by the single-beam lidar 206 cannot reach the reflective surface of the laser reflection plate 204, resulting in a failure in the measurement of the trailer angle. Therefore, in the embodiment of the present disclosure, the current trailer angle scenario (a scenario with a large trailer angle or a scenario with a small trailer angle) can be determined based on the initial trailer angle, so as to determine whether to use the single-beam lidar 206 or the multiple-beam lidar 203 for trailer angle measurement.

Figure 5:
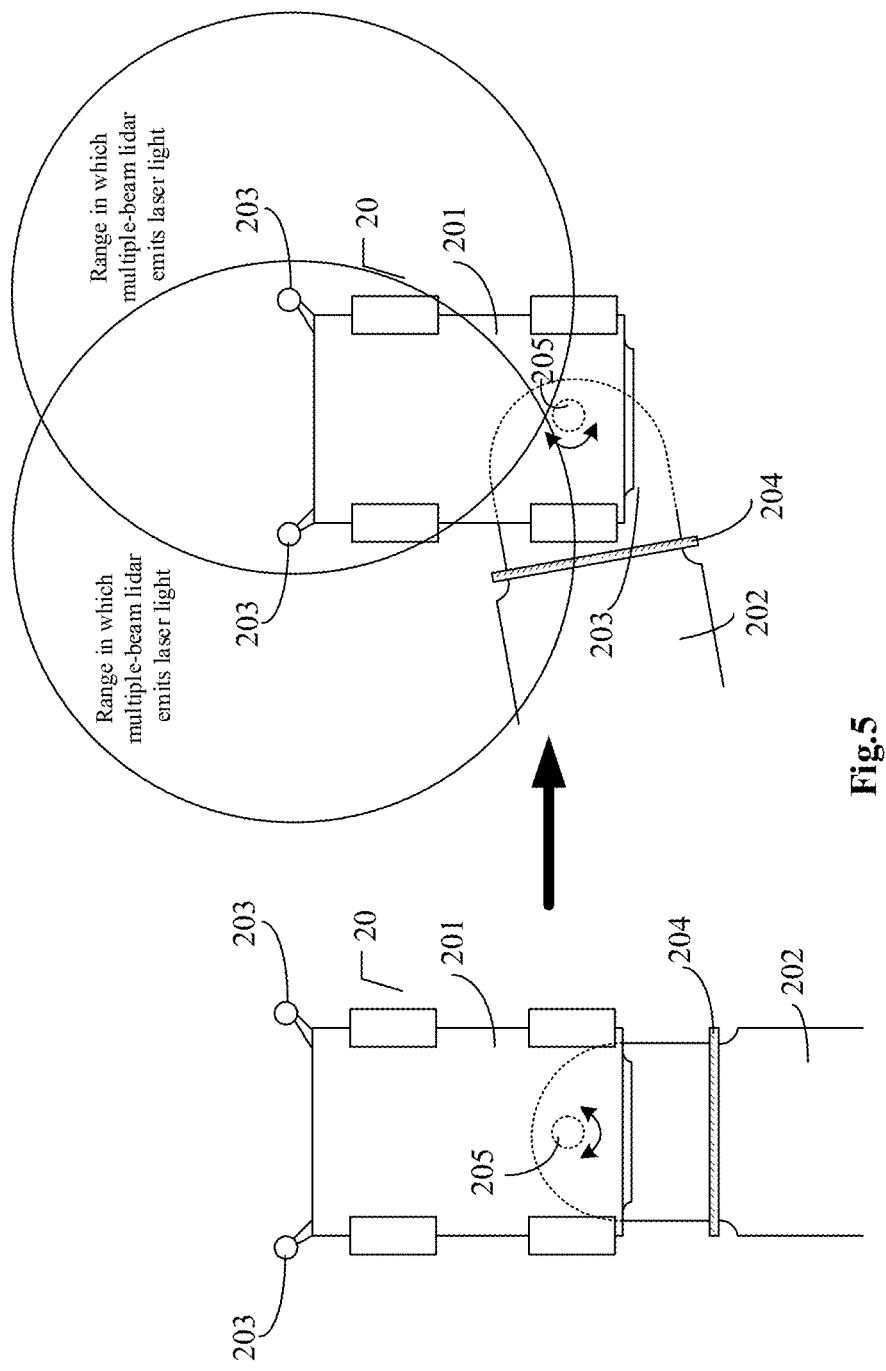
FIG. 5 is a second schematic diagram showing a scenario of lidar collection according to an embodiment of the present disclosure.

As shown in FIG. 5, in the present disclosure, on both sides of the tractor 201 (such as the left and right sides of the front part of the tractor 201, that is, the front face of the vehicle), at least one multiple-beam lidar 203 is provided (for example, one, two, or more multiple-beam lidars can be provided on each of the left and right sides, as shown in FIG. 5, which only shows one multiple-beam lidar on each of the left and right sides for the purpose of illustration). When the laser reflection plate 204 moves to a side of the tractor 201, the laser light emitted by the multiple-beam lidar on at least one side can reach the surface of the trailer and thus can be used for measurement of the trailer angle.

Figure 6:
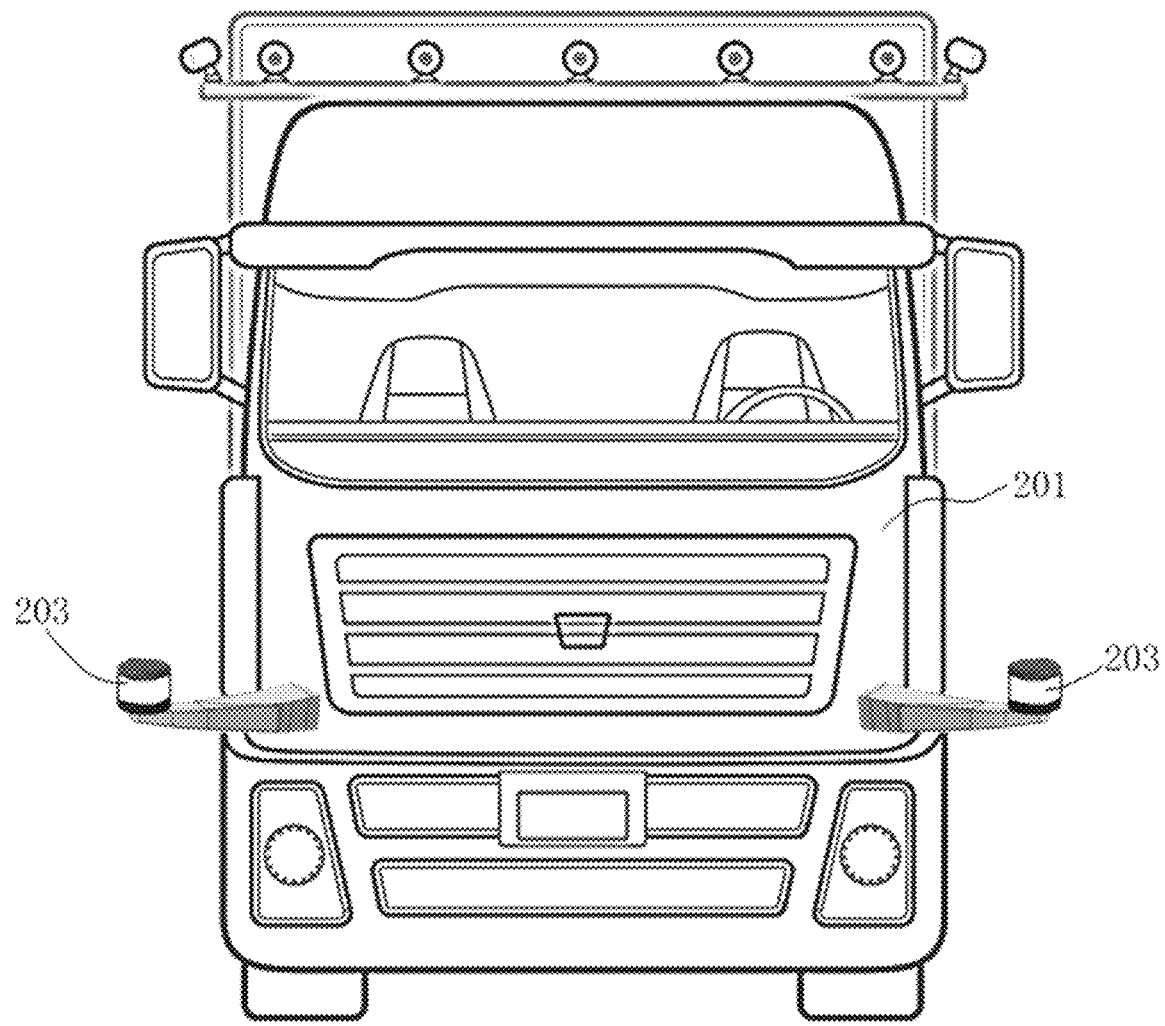
FIG. 6 is a first schematic diagram showing a distribution of multiple-beam lidars according to an embodiment of the present disclosure.
Figure 7:
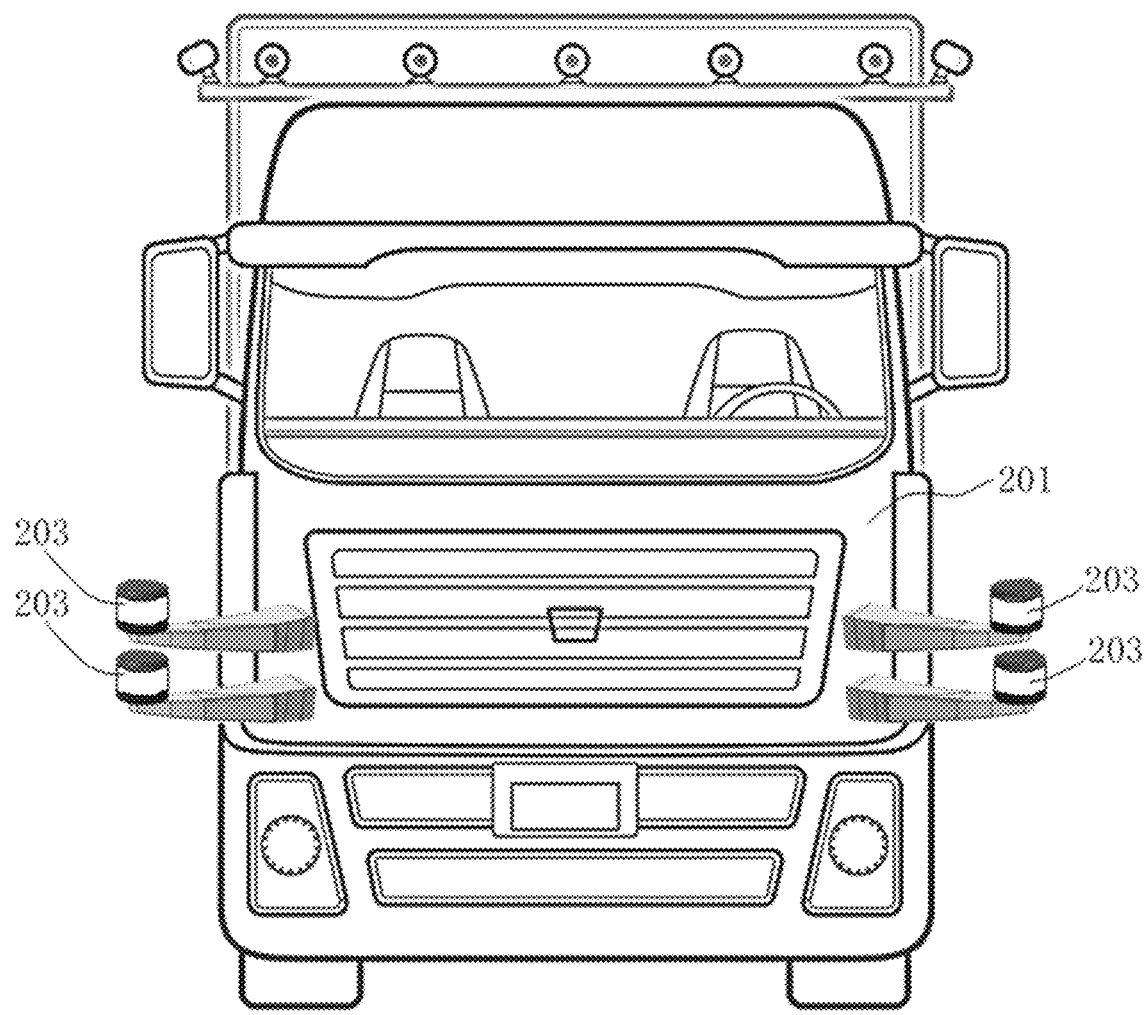
FIG. 7 is a second schematic diagram showing a distribution of multiple-beam lidars according to an embodiment of the present disclosure.

Here, in order to illustrate that at least one multiple-beam lidar 203 is provided on both sides of the tractor 201, as shown in FIGS. 6 and 7, the distribution of the multiple-beam lidars 203 at the front part of the tractor 201 may include one multiple-beam lidar 203 (FIG. 6), or two multiple-beam lidars 203 (FIG. 7), being provided on each of the left and right sides. However, the present disclosure is not limited to any of these examples. Without consideration for the cost, even more multiple-beam lidars can be provided on the left and right sides, and when measurement results are then obtained, the measurement results can be fused to make the obtained measurement results more accurate.

It is to be noted that, the multiple-beam lidars used in the embodiment of the present disclosure may be 16-beam, 32-beam, 64-beam lidar, etc., and the present disclosure is not limited to any these examples.

Figure 8:
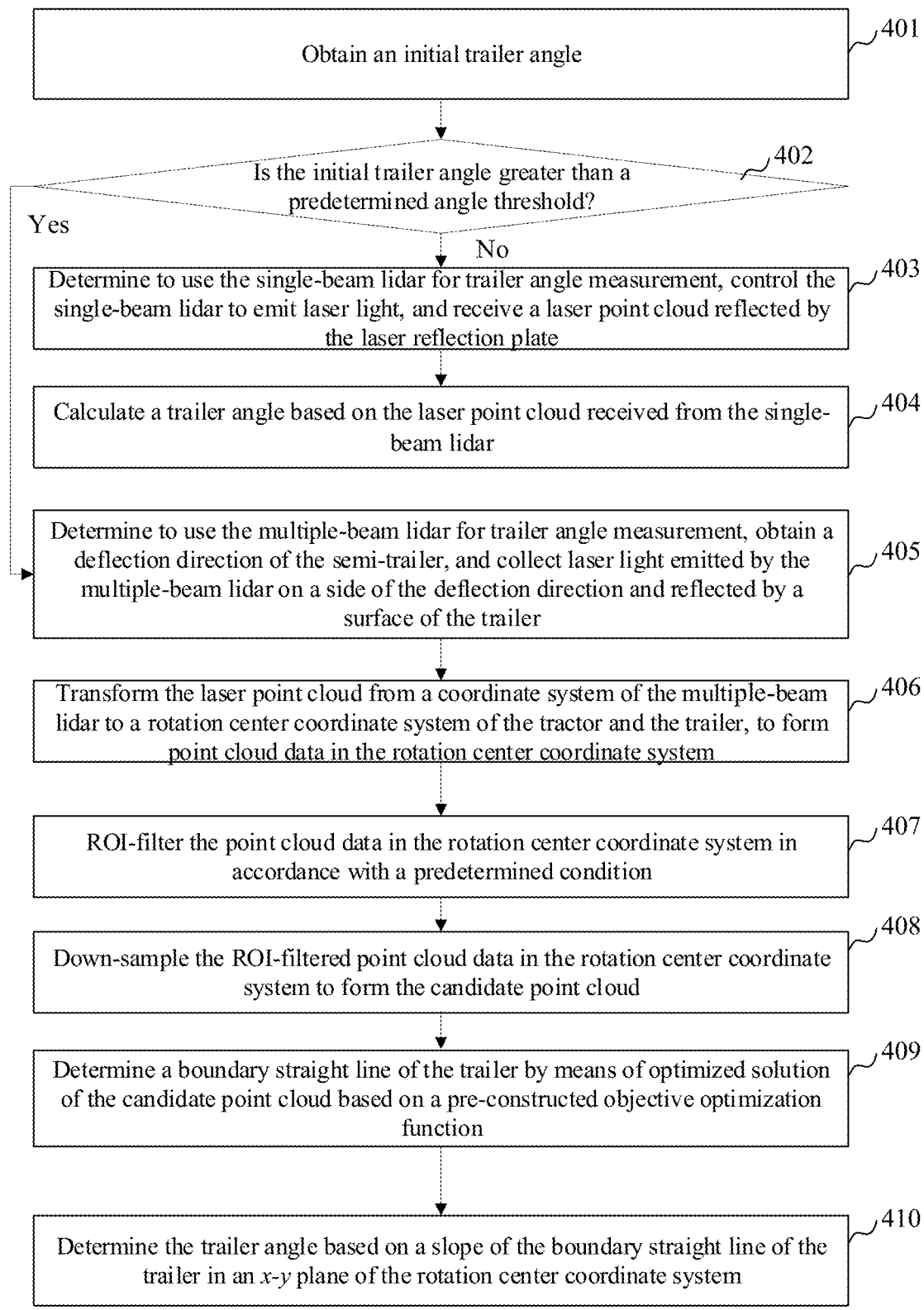
FIG. 8 is a second flowchart illustrating a method for trailer angle measurement according to an embodiment of the present disclosure.

In order to enable those skilled in the art to better understand the present disclosure, a more detailed embodiment will be given below. As shown in FIG. 8, an embodiment of the application provides a method for trailer angle measurement, which can be applied to the above semi-trailer 20 as shown in FIG. 3. The structure of the semi-trailer 20 has been described above and will not be repeated here. The method includes the following steps.

At step 401, an initial trailer angle is obtained.

It is to be noted that the trailer angle measurement can be carried out according to a predetermined period, for example, once every 1 second. Therefore, the initial trailer angle may be a trailer angle obtained in the previous period according to the method of the embodiment of the present disclosure. In addition, when the trailer angle is initially measured, the initial trailer angle can alternatively be an initial value obtained from an external environment (e.g., it can be inputted manually, identified by an external visual sensor, etc.). For example, in consideration of actual operation conditions and robustness, the initialization can be started with a small angle, e.g., by using the single-beam lidar to obtain the initial trailer angle, and the present disclosure is not limited to this. There are many ways to obtain the initial trailer angle, which will not be listed here.

At step 402, it is determined whether the initial trailer angle is greater than a predetermined angle threshold.

Here, the angle threshold can be predetermined according to the position where the single-beam lidar or the multiple-beam lidar is mounted and the structures of the tractor and the trailer, so as to ensure that the trailer angle can be measured when the single-beam lidar or the multiple-beam lidar is used. For example, the angle threshold may be 30°, 40°, 45°, etc., and the present disclosure is not limited to any these examples.

When the initial trailer angle is smaller than or equal to the predetermined angle threshold, the method proceeds with step 403.

When the initial trailer angle is greater than the predetermined angle threshold, the method proceeds with step 405.

At step 403, it is determined to use the single-beam lidar for trailer angle measurement, the single-beam lidar is controlled to emit laser light, and a laser point cloud reflected by the laser reflection plate is received.

At step 404, a trailer angle is calculated based on the laser point cloud received from the single-beam lidar.

Here, the method of calculating the trailer angle based on the laser point cloud received from the single-beam lidar can be found in the patent application with the publication number CN108761481A, and details thereof will be omitted here.

At step 405, it is determined to use the multiple-beam lidar for trailer angle measurement, a deflection direction of the semi-trailer is obtained, and laser light emitted by the multiple-beam lidar on a side of the deflection direction and reflected by a surface of the trailer is collected.

Here, the operation of obtaining the deflection direction of the semi-trailer can be implemented in various schemes.

Scheme 1: The deflection direction of the semi-trailer can be determined as left-turn or right-turn based on the trailer angle in the previous period.

Scheme 2: The deflection direction of the semi-trailer can be determined as left-turn or right-turn based on a vehicle turning signal of the semi-trailer.

There are many specific ways to obtain the deflection direction of the semi-trailer, and details thereof will be omitted here.

When the deflection direction of the semi-trailer is left-turn, the multiple-beam lidar on the left side of the semi-trailer can be applied, or when the deflection direction of the semi-trailer is right-turn, the multiple-beam lidar on the right side of the semi-trailer can be applied, such that the multiple-beam lidar can collect the point cloud data on the surface of the trailer.

Here, the trailer may or may not carry a container, and the present disclosure is not limited to any these examples.

Typically, the sampling frequency of each multiple-beam lidar can be 10 Hz, but the present disclosure is not limited to this. In addition, each multiple-beam lidar can emit laser light with its own identification, so as to ensure that when the multiple-beam lidar receives the laser point cloud reflected by the surface of the trailer, it can only receive its corresponding laser point cloud, without receiving the laser point clouds corresponding to other multiple-beam lidars. In addition, due to the structural characteristics of the semi-trailer 20, there may be a certain trailer angle for which typically only the multiple-beam lidar on one side can receive the laser point cloud reflected by the surface of the trailer.

Figure 9:
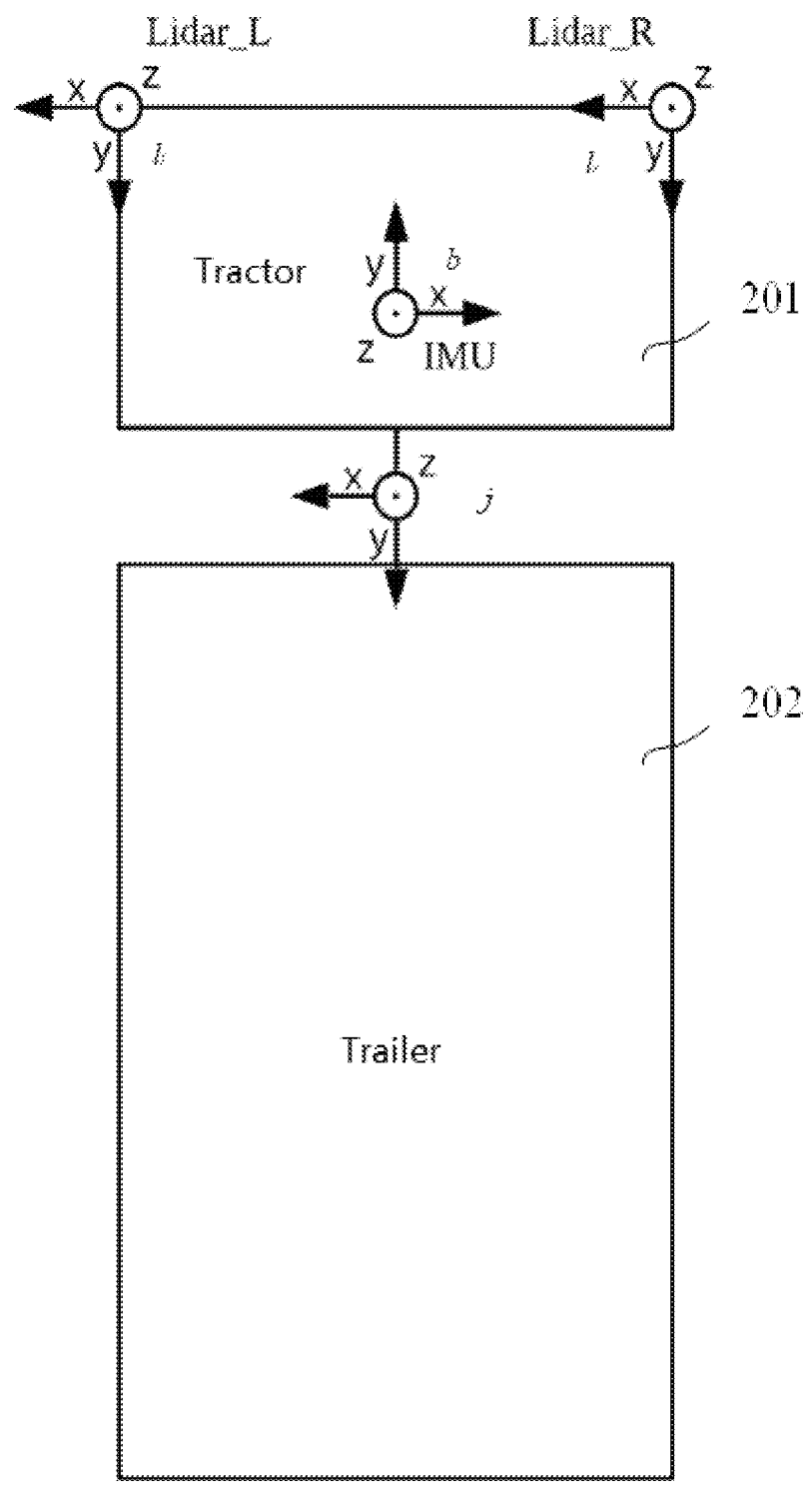
FIG. 9 is a schematic diagram showing a coordinate system in a semi-trailer scenario according to an embodiment of the present disclosure.

At step 406, the laser point cloud is transformed from a coordinate system of the multiple-beam lidar to a rotation center coordinate system of the tractor and the trailer, to form point cloud data in the rotation center coordinate system It is to be noted that, generally in the autonomous driving technology, in order to study a semi-trailer with a tractor and a trailer, as shown in FIG. 9, the coordinate system of the entire semi-trailer can include coordinate systems 1 for multiple-beam lidars (including a coordinate system $l_l$ of the left multiple-beam lidar (Lidar_L) and a coordinate system $l_r$ of the right multiple-beam lidar (Lidar_R), when any of the coordinate systems of the multiple-beam lidars is to be applied, it can be determined to apply the coordinate system of the corresponding multiple-beam lidar depending on whether the vehicle is having a left-turn or a right-turn), the rotation center coordinate system j of the tractor and the trailer, and a coordinate system b of a vehicle body IMU.

Then in step 406, the laser point cloud can be transformed from the coordinate system of the multiple-beam lidar to the rotation center coordinate system of the tractor and the trailer to form the point cloud data in the rotation center coordinate system by:

transforming the laser point cloud in the coordinate system of the multiple-beam lidar, $P=\{p_0, \ldots, p_i, \ldots, p_n\}, p_i \in \mathbb{R}^4, \mathbb{R}^4:x, y, z, i$ into the rotation center coordinate system of the tractor and the trailer according to:

$$p'_i = T_b^j T_l^b p_i = \begin{bmatrix} R_l^j & t_l^j \\ 0^T & 1 \end{bmatrix} p_i = R_l^j p_i + t_l^j,$$

to form the point cloud data in the rotation center coordinate system, $P'=\{p'_0, \ldots, p'_i, \ldots, p'_n\}$, where $\mathbb{R}^4$ represents a dimension of the laser point cloud, x, y, z represent three-dimensional coordinates of the laser point cloud, i represents a reflection intensity; $T_b^j$ is a transformation relationship from a coordinate system b of a vehicle body Inertial Measurement Unit (IMU) to the rotation center coordinate system j of the tractor and trailer, $T_l^b$ is a transformation relationship from the coordinate system l/of the multiple-beam lidar to the coordinate system b of the vehicle body IMU, $R_l^j$ represents a rotation matrix from the coordinate system l of the multiple-beam lidar to the rotation center coordinate system j of the tractor and trailer, and $t_l^j$ represents a translation matrix from the coordinate system l of the multiple-beam lidar to the rotation center coordinate system j of the tractor and trailer.

At step 407, the point cloud data in the rotation center coordinate system is Region of Interest (ROI) filtered in accordance with a predetermined condition.

In step 407 here, the point cloud data in the rotation center coordinate system can be ROI-filtered in accordance with the predetermined condition by:

selecting, from the point cloud data in the rotation center coordinate system, $P'=\{p'_0, \ldots, p'_i, \ldots, p'_n\}$, point cloud data that meets the predetermined condition.

The predetermined condition may include the following conditions.

Condition ①: in an x-y plane of the rotation center coordinate system, a distance between the point cloud and an origin of the rotation center coordinate system is smaller than a predetermined distance threshold $d_r$.

With Condition ①, interference points having relatively large distances can be filtered out.

Condition ②: point cloud three-dimensional coordinates of the point cloud data in the rotation center coordinate system is within a predetermined three-dimensional coordinate range.

Here, the predetermined three-dimensional coordinate range can be determined based on coordinates of three-dimensional model points of a vehicle body surface in the rotation center coordinate system and a trailer angle in a previous period. For example, according to the trailer angle in the previous period and the coordinates of the three-dimensional model points of the vehicle body surface in the rotation center coordinate system as obtained in advance (which can be used to indicate the size of the vehicle body, and can be determined in advance by scanning with an external lidar), a range in a region having a predetermined distance outside the trailer in the previous period can be determined as within the predetermined three-dimensional coordinate range.

Figure 10:
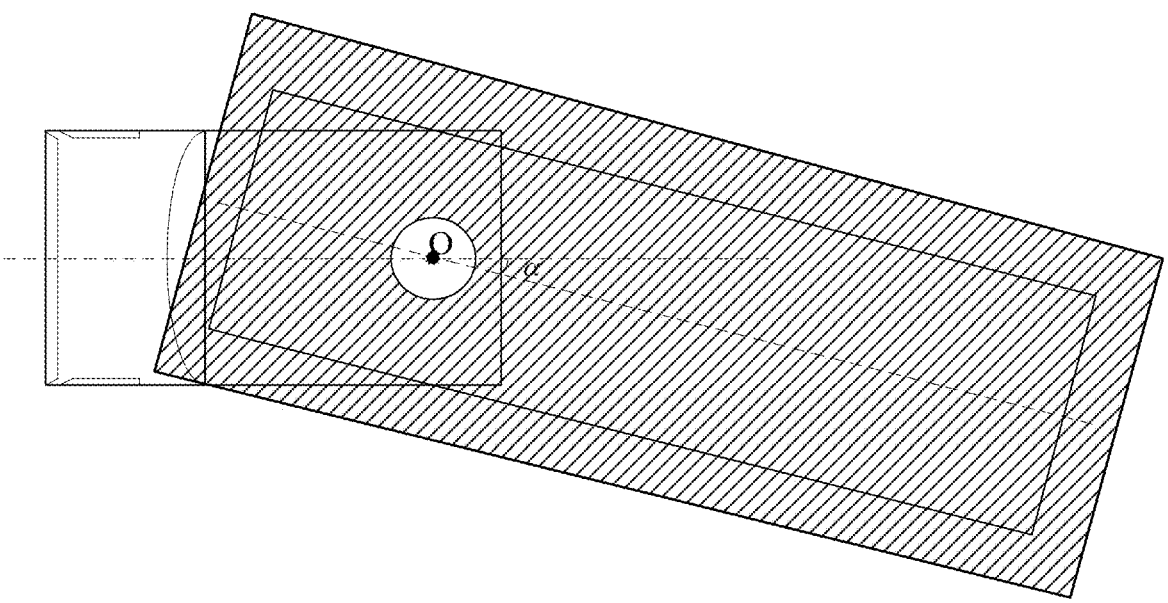
FIG. 10 is a schematic diagram showing a predetermined three-dimensional coordinate range according to an embodiment of the present disclosure.

For example, as shown in FIG. 10, when the trailer angle in the previous period and the coordinates of the three-dimensional model points of the vehicle body surface in the rotation center coordinate system as obtained in advance are known, a current posture of the trailer can be obtained, such that a range in a region having a predetermined distance outside the trailer in the previous period (the shaded region in the figure only describes the region within a planar range, in fact, there are similar regions above and below the trailer), a three-dimensional region range, can be determined as the predetermined three-dimensional coordinate range. The reason for this setting is that the time between adjacent periods is short (usually 0.1 s), and the trailer angle changes slightly. Therefore, the trailer has a small change between the current period and the previous period, and should be within the predetermined three-dimensional coordinate range.

With Condition ②, interference points outside a certain range around the vehicle body can be removed.

Condition ③: a reflection intensity corresponding to the point cloud in the point cloud data in the rotation center coordinate system is greater than a predetermined reflection intensity threshold With Condition ③, points that have low reflection intensity and are possibly noise can be removed.

At step 408, the ROI-filtered point cloud data in the rotation center coordinate system is down-sampled to form a candidate point cloud.

At step 409, a boundary straight line of the trailer is determined by means of optimized solution of the candidate point cloud based on a pre-constructed objective optimization function.

In step 409 here, the boundary straight line of the trailer can be determined by means of optimized solution of the candidate point cloud based on the pre-constructed objective optimization function by:

determining the boundary straight line of the trailer by means of optimized solution (e.g., using the LM (Levenberg-Marquardt) method for the optimized solution) of the candidate point cloud based on the pre-constructed objective optimization function:

$$\min_X \frac{1}{2} \|f(X)\|_\lambda^2$$

where X is an argument and X={a,b}, X={a,b} represents parameters a and b in the boundary straight line of the trailer to be determined, y=ax+b, $f(X)$ is a residual function $$f(X) = f(a, b) = \left| \frac{ax+b-y}{\sqrt{a^2+1}} \right| + \alpha(y - ax - b), \| \|_\lambda^2$$

and is a robust kernel function; x, y are coordinate information of the candidate point cloud in an x-y plane of the rotation center coordinate system, and α is a predetermined regular penalty factor.

In this way, the boundary straight line of the trailer obtained based on the objective optimization function can allow the candidate point cloud to be located on the side with the vehicle, and make the entire point cloud closest to the boundary straight line of the trailer.

At step 410, the trailer angle is determined based on a slope of the boundary straight line of the trailer in an x-y plane of the rotation center coordinate system.

Figure 11:
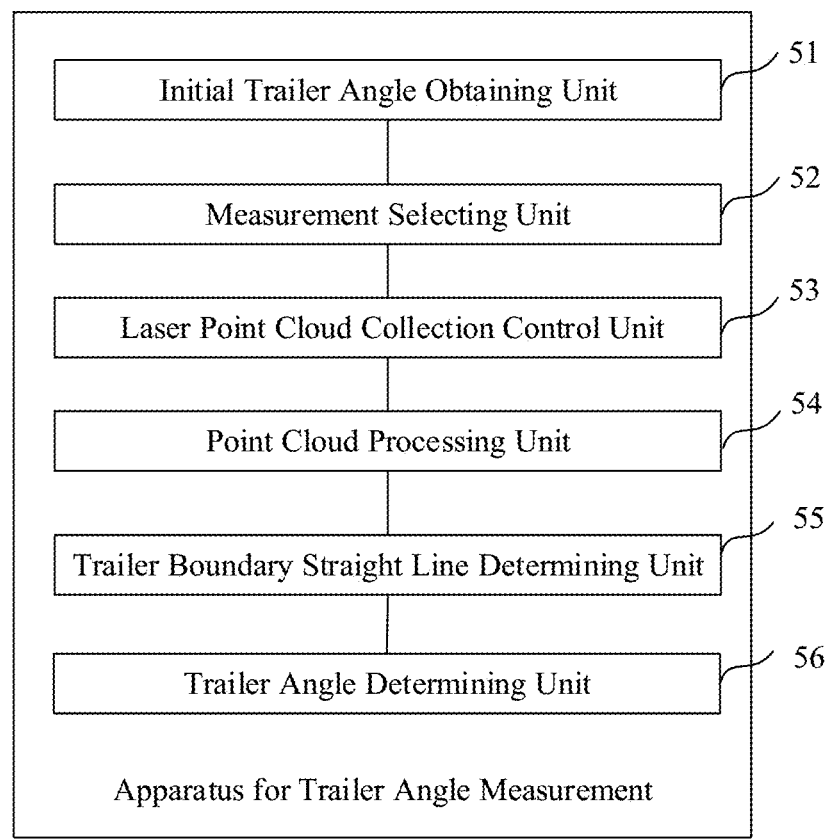
FIG. 11 is a schematic diagram showing a structure of an apparatus for trailer angle measurement according to an embodiment of the present disclosure.

In addition, as shown in FIG. 11, the embodiment of the present disclosure also provides an apparatus for trailer angle measurement is provided. The apparatus is applied in a semi-trailer including a tractor and a trailer. A single-beam lidar is provided at a rear part of the tractor, at least one multiple-beam lidar is provided on both sides of the tractor, and a laser reflection plate corresponding to a position of the single-beam lidar is provided at a head of the trailer. The specific structure of the semi-trailer has been described in the above embodiment, and details thereof will be omitted here.

In FIG. 11, the apparatus for trailer angle measurement includes:

an initial trailer angle obtaining unit 51 configured to obtain an initial trailer angle;

a measurement selecting unit 52 configured to determine whether to use the single-beam lidar or the multiple-beam lidar for trailer angle measurement based on the initial trailer angle;

a laser point cloud collection control unit 53 configured to obtain, when it is determined to use the multiple-beam lidar for trailer angle measurement, a deflection direction of the semi-trailer and collect laser light emitted by the multiple-beam lidar on a side of the deflection direction and reflected by a surface of the trailer;

a point cloud processing unit 54 configured to apply a coordinate transformation and selection process on the laser point cloud to form a candidate point cloud;

a trailer boundary straight line determining unit 55 configured to determine a boundary straight line of the trailer by means of optimized solution of the candidate point cloud based on a pre-constructed objective optimization function; and a trailer angle determining unit 56 configured to determine a trailer angle based on the boundary straight line of the trailer.

Figure 12:
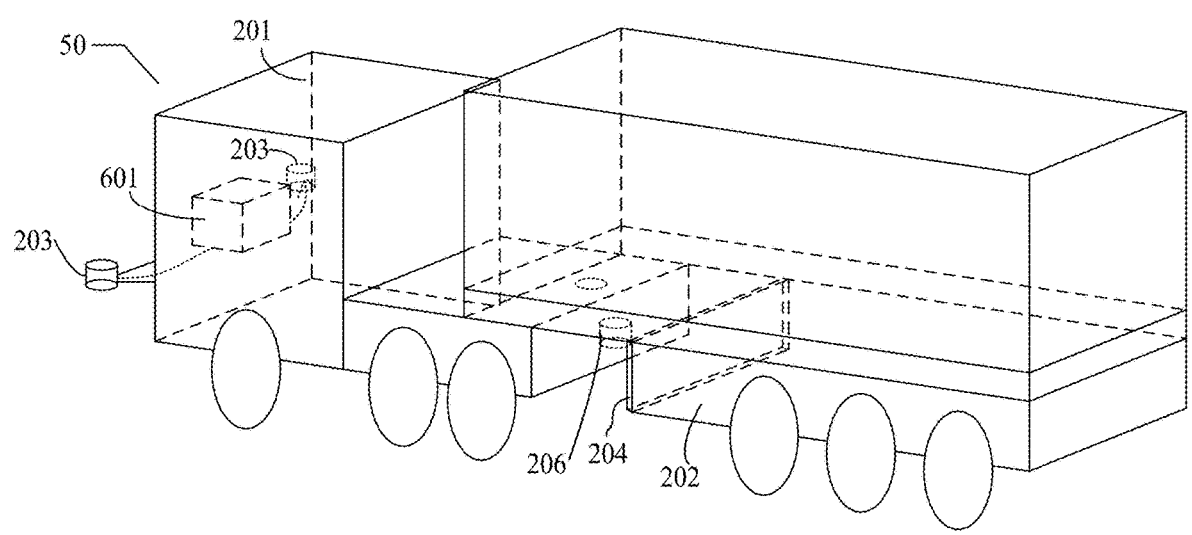
FIG. 12 is a schematic diagram showing a structure of a vehicle according to an embodiment of the present disclosure.

In addition, as shown in FIG. 12, an embodiment of the present disclosure provides a vehicle 50, which includes an apparatus for trailer angle measurement 601, a tractor 201, and a trailer 202. A single-beam lidar 206 is provided at a rear part of the tractor 201. At least one multiple-beam lidar 203 is provided on both sides of the tractor 201 (for example, one, two, or more multiple-beam lidars can be provided on each of the left and right sides, as shown in FIG. 12, which only shows one multiple-beam lidar on each of the left and right sides for the purpose of illustration). A laser reflection plate 204 corresponding to a position of the single-beam lidar 206 is provided on a head of the trailer 202.

The apparatus for trailer angle measurement 601 is communicatively connected to the single-beam lidar 206 and each multiple-beam lidar 203, and configured to: obtain an initial trailer angle; determine whether to use the single-beam lidar or the multiple-beam lidar for trailer angle measurement based on the initial trailer angle; obtain, when it is determined to use the multiple-beam lidar for trailer angle measurement, a deflection direction of the semi-trailer, and collect laser light emitted by the multiple-beam lidar on a side of the deflection direction and reflected by a surface of the trailer; apply a coordinate transformation and selection process on the laser point cloud to form a candidate point cloud; determine a boundary straight line of the trailer by means of optimized solution of the candidate point cloud based on a pre-constructed objective optimization function; and determine a trailer angle based on the boundary straight line of the trailer.

In addition, according to an embodiment of the present disclosure, a computer readable storage medium is provided. The computer readable storage medium includes a program or instructions which, when executed on a computer, cause the computer to perform the method for trailer angle measurement according to the above embodiment, and description thereof will be omitted here.

In addition, according to an embodiment of the present disclosure, a computer program product is provided. The computer program product includes instructions. The computer program product, when executed on a computer, causes the computer to perform the method for trailer angle measurement according to the above embodiment, and description thereof will be omitted here.

In addition, according to an embodiment of the present disclosure, a chip system is provided. The chip system includes a processor. The processor is coupled to a memory storing program instructions which, when executed by the processor, cause the processor to perform the method for trailer angle measurement according to the above embodiment, and description thereof will be omitted here.

In addition, according to an embodiment of the present disclosure, a computer server is provided. The computer server includes a memory and one or more processors communicatively connected to the memory. The memory stores instructions executable by the one or more processors, the instructions, when executed by the one or more processors, causing the one or more processors to perform the method for trailer angle measurement according to the above embodiment, and description thereof will be omitted here.

The embodiments of the present disclosure provide a method and an apparatus for trailer angle measurement, as well as a vehicle, applied in a semi-trailer including a tractor and a trailer. A single-beam lidar is provided at a rear part of the tractor, at least one multiple-beam lidar is provided on both sides of the tractor, and a laser reflection plate corresponding to a position of the single-beam lidar is provided at a head of the trailer. As such, in the embodiments of the present disclosure, it can be determined whether to use a single-beam lidar or a multiple-beam lidar for trailer angle measurement based on an initial trailer angle. When it is determined to use the multiple-beam lidar for trailer angle measurement, a deflection direction of the semi-trailer can be obtained, and laser light emitted by the multiple-beam lidar on a side of the deflection direction and reflected by a surface of the trailer can be collected. A coordinate transformation and selection process can be applied on the laser point cloud to form a candidate point cloud. A boundary straight line of the trailer can be determined by means of optimized solution of the candidate point cloud based on a pre-constructed objective optimization function. A trailer angle can be determined based on the boundary straight line of the trailer. Therefore, the embodiments of the present disclosure can achieve fast and accurate measurement of a trailer angle with a simple structure.

In addition, the embodiments of the present disclosure do not rely on priori models, and allow rapid deployment on semi-trailer trucks of any type. In terms of performance parameters of the embodiments of the present disclosure, a full-angle detection can be achieved, and the error between the detection result and the true value is within 0.3°. The fluctuation in consistency of the detection result in static and dynamic scenarios is within ±0.25°, and the detection frequency can be up to 20 Hz, which ensures real-time characteristics of the results.

It can be appreciated by those skilled in the art that the embodiments of the present disclosure can be implemented as a method, a system or a computer program product. The present disclosure may include pure hardware embodiments, pure software embodiments and any combination thereof Also, the present disclosure may include a computer program product implemented on one or more computer readable storage mediums (including, but not limited to, magnetic disk storage, CD-ROM, and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In the present disclosure, the principles and implementations of the present disclosure have been described with reference to specific embodiments. These embodiments are illustrative only, for facilitating understanding of the methods according to the present disclosure and core concepts thereof. Moreover, for those of ordinary skill in the art, modifications can be made to the specific implementations and application scenarios without departing from the principle of the present disclosure. In summary, the content of the specification should not be construed as limitation to the present disclosure.

What is claimed is:

1. A method for trailer angle measurement, applied in a semi-trailer comprising a tractor and a trailer, a single-beam lidar being provided at a rear part of the tractor, at least one multiple-beam lidar being provided on both sides of the tractor, and a laser reflection plate corresponding to a position of the single-beam lidar being provided at a head of the trailer, the method comprising:
  obtaining an initial trailer angle;
  determining whether to use the single-beam lidar or the multiple-beam lidar for trailer angle measurement based on the initial trailer angle;
  obtaining, when it is determined to use the multiple-beam lidar for trailer angle measurement, a deflection direction of the semi-trailer, and collecting laser light emitted by the multiple-beam lidar on a side of the deflection direction and reflected by a surface of the trailer;
  applying a coordinate transformation and selection process on a laser point cloud to form a candidate point cloud;
  determining a boundary straight line of the trailer by means of optimized solution of the candidate point cloud based on a pre-constructed objective optimization function; and
  determining a trailer angle based on the boundary straight line of the trailer;
  wherein said applying the coordinate transformation and selection process on the laser point cloud to form the candidate point cloud comprises:
  transforming the laser point cloud from a coordinate system of the multiple-beam lidar to a rotation center coordinate system of the tractor and the trailer, to form point cloud data in the rotation center coordinate system;
  region of interest (ROI) filtering the point cloud data in the rotation center coordinate system in accordance with a predetermined condition; and
  down-sampling the ROI-filtered point cloud data in the rotation center coordinate system to form the candidate point cloud.

2. The method of claim 1, wherein said determining whether to use the single-beam lidar or the multiple-beam lidar for trailer angle measurement based on the initial trailer angle comprises:
  determining whether the initial trailer angle is greater than a predetermined angle threshold; and
  determining to use the multiple-beam lidar for trailer angle measurement when the initial trailer angle is greater than the predetermined angle threshold; or
  determining to use the single-beam lidar for trailer angle measurement when the initial trailer angle is smaller than or equal to the predetermined angle threshold.

3. The method of claim 1, wherein said transforming the laser point cloud from the coordinate system of the multiple-beam lidar to the rotation center coordinate system of the tractor and the trailer, to form the point cloud data in the rotation center coordinate system comprises:
  transforming the laser point cloud in the coordinate system of the multiple-beam lidar, $P=\{p_0, \ldots, p_i, \ldots, p_n\}$, $p_i \in \mathbb{R}^4$, $\mathbb{R}^4$:$x$, $y$, $z$, $i$, into the rotation center coordinate system of the tractor and the trailer according to:

$$p'_i = T_b^j T_l^b p_i = \begin{bmatrix} R_l^j & t_l^j \\ 0^T & 1 \end{bmatrix} p_i = R_l^j p_i + t_l^j,$$

to form the point cloud data in the rotation center coordinate system, $P'=\{p'_0, \ldots, p'_i, \ldots, p'_n\}$, where $\mathbb{R}^4$ represents a dimension of the laser point cloud, x, y, z represent three-dimensional coordinates of the laser point cloud, i represents a reflection intensity; $T_b^j$ is a transformation relationship from a coordinate system b of a vehicle body Inertial Measurement Unit (IMU) to a rotation center coordinate system j of the tractor and trailer, $T_l^b$ is a transformation relationship from a coordinate system l of the multiple-beam lidar to the coordinate system b of the vehicle body IMU, $R_l^j$ represents a rotation matrix from the coordinate system l of the multiple-beam lidar to the rotation center coordinate system j of the tractor and trailer, and $t_l^j$ represents a translation matrix from the coordinate system 1 of the multiple-beam lidar to the rotation center coordinate system j of the tractor and trailer.

4. The method of claim 3, wherein said ROI-filtering the point cloud data in the rotation center coordinate system in accordance with the predetermined condition comprises:
selecting, from the point cloud data in the rotation center coordinate system, $P'=\{p'_0, \ldots, p'_i, \ldots, p'_n\}$, point cloud data that meets the predetermined condition, wherein the predetermined condition comprises:
in an x-y plane of the rotation center coordinate system, a distance between the point cloud and an origin of the rotation center coordinate system being smaller than a predetermined distance threshold $d_t$;
point cloud three-dimensional coordinates of the point cloud data in the rotation center coordinate system being within a predetermined three-dimensional coordinate range, the predetermined three-dimensional coordinate range being determined based on coordinates of three-dimensional model points of a vehicle body surface in the rotation center coordinate system and a trailer angle in a previous period; and
a reflection intensity corresponding to the point cloud in the point cloud data in the rotation center coordinate system being greater than a predetermined reflection intensity threshold.

5. The method of claim 1, wherein said determining the boundary straight line of the trailer by means of optimized solution of the candidate point cloud based on the pre-constructed objective optimization function comprises:
determining the boundary straight line of the trailer by means of optimized solution of the candidate point cloud based on the pre-constructed objective optimization function:

$$\min_X \frac{1}{2} \|f(X)\|_\lambda^2$$

where X is an argument and X={a,b}, X={a,b} represents parameters a and b in the boundary straight line of the trailer to be determined, y=ax+b; $f(X)$ is a residual function and $$f(X) = f(a, b) = \left| \frac{ax + b - y}{\sqrt{a^2 + 1}} \right| + \alpha(y - ax - b), \| \|_\lambda^2$$

is a robust kernel function; x, y are coordinate information of the candidate point cloud in an x-y plane of the rotation center coordinate system, and $\alpha$ is a predetermined regular penalty factor.

6. The method of claim 1, wherein said determining the trailer angle based on the boundary straight line of the trailer comprises:
determining the trailer angle based on a slope of the boundary straight line of the trailer in an x-y plane of the rotation center coordinate system.

7. The method of claim 2, further comprising:
controlling, when it is determined to use the single-beam lidar for trailer angle measurement, the single-beam lidar to emit laser light and receive a laser point cloud reflected by the laser reflection plate; and
calculating the trailer angle based on the laser point cloud received from the single-beam lidar.

8. A vehicle, comprising an apparatus for trailer angle measurement, a tractor, and a trailer, a single-beam lidar being provided at a rear part of the tractor, at least one multiple-beam lidar being provided on both sides of the tractor, and a laser reflection plate corresponding to a position of the single-beam lidar being provided at a head of the trailer, wherein
the apparatus for trailer angle measurement is communicatively connected to the single-beam lidar and each multiple-beam lidar, and configured to:
obtain an initial trailer angle;
determine whether to use the single-beam lidar or the multiple-beam lidar for trailer angle measurement based on the initial trailer angle;
obtain, when it is determined to use the multiple-beam lidar for trailer angle measurement, a deflection direction of the trailer, and collect laser light emitted by the multiple-beam lidar on a side of the deflection direction and reflected by a surface of the trailer;
apply a coordinate transformation and selection process on a laser point cloud to form a candidate point cloud;
determine a boundary straight line of the trailer by means of optimized solution of the candidate point cloud based on a pre-constructed objective optimization function; and
determine a trailer angle based on the boundary straight line of the trailer;
wherein the apparatus for trailer angle measurement is configured to apply the coordinate transformation and selection process on the laser point cloud to form the candidate point cloud by:
transforming the laser point cloud from a coordinate system of the multiple-beam lidar to a rotation center coordinate system of the tractor and the trailer, to form point cloud data in the rotation center coordinate system;
region of interest (ROI) filtering the point cloud data in the rotation center coordinate system in accordance with a predetermined condition; and
down-sampling the ROI-filtered point cloud data in the rotation center coordinate system to form the candidate point cloud.

9. The vehicle of claim 8, wherein the apparatus for trailer angle measurement is configured to determine whether to use the single-beam lidar or the multiple-beam lidar for trailer angle measurement based on the initial trailer angle by:
determining whether the initial trailer angle is greater than a predetermined angle threshold; and
determining to use the multiple-beam lidar for trailer angle measurement when the initial trailer angle is greater than the predetermined angle threshold; or
determining to use the single-beam lidar for trailer angle measurement when the initial trailer angle is smaller than or equal to the predetermined angle threshold.

10. The vehicle of claim 8, wherein the apparatus for trailer angle measurement is configured to transform the laser point cloud from the coordinate system of the multiple-beam lidar to the rotation center coordinate system of the tractor and the trailer, to form the point cloud data in the rotation center coordinate system by:
transforming the laser point cloud in the coordinate system of the multiple-beam lidar, $P=\{p_0, \ldots, p_i, \ldots, p_n\}$, $p_i \in \mathbb{R}^4$, $\mathbb{R}^4: x, y, z, i$, into the rotation center coordinate system of the tractor and the trailer according to:

$$p'_i = T_b^j T_l^b p_i = \begin{bmatrix} R_l^j & t_l^j \\ 0^T & 1 \end{bmatrix} p_i = R_l^j p_i + t_l^j,$$

to form the point cloud data in the rotation center coordinate system, $P'=\{p'_0, \ldots, p'_i, \ldots, p'_n\}$, where $\mathbb{R}^4$ represents a dimension of the laser point cloud, x, y, z represent three-dimensional coordinates of the laser point cloud, i represents a reflection intensity; $T_b^j$ is a transformation relationship from a coordinate system b of a vehicle body Inertial Measurement Unit (IMU) to rotation center coordinate system j of the tractor and trailer, $T_l^b$ is a transformation relationship from a coordinate system l of the multiple-beam lidar to the coordinate system b of the vehicle body IMU, represents a rotation matrix from the coordinate system l of the multiple-beam lidar to the rotation center coordinate system j of the tractor and trailer, and $t_l^j$ represents a translation matrix from the coordinate system l of the multiple-beam lidar to the rotation center coordinate system j of the tractor and trailer.

11. The vehicle of claim 10, wherein the apparatus for trailer angle measurement is configured to ROI-filter the point cloud data in the rotation center coordinate system in accordance with the predetermined condition by:

selecting, from the point cloud data in the rotation center coordinate system, $P'=\{p'_0, \ldots, p'_i, \ldots, p'_n\}$, point cloud data that meets the predetermined condition, wherein the predetermined condition comprises:

in an x-y plane of the rotation center coordinate system, a distance between the point cloud and an origin of the rotation center coordinate system being smaller than a predetermined distance threshold $d_r$;

point cloud three-dimensional coordinates of the point cloud data in the rotation center coordinate system being within a predetermined three-dimensional coordinate range, the predetermined three-dimensional coordinate range being determined based on coordinates of three-dimensional model points of a vehicle body surface in the rotation center coordinate system and a trailer angle in a previous period; and a reflection intensity corresponding to the point cloud in the point cloud data in the rotation center coordinate system being greater than a predetermined reflection intensity threshold.

12. The vehicle of claim 8, wherein the apparatus for trailer angle measurement is configured to determining the boundary straight line of the trailer by means of optimized solution of the candidate point cloud based on the pre-constructed objective optimization function by:

determining the boundary straight line of the trailer by means of optimized solution of the candidate point cloud based on the pre-constructed objective optimization function:

$$\min_X \frac{1}{2} \|f(X)\|_\lambda^2$$

where X is an argument and X={a,b}, X={a,b} represents parameters a and b in the boundary straight line of the trailer to be determined, y=ax+b; $f(X)$ is a residual function and $$f(X) = f(a, b) = \left| \frac{ax + b - y}{\sqrt{a^2 + 1}} \right| + \alpha(y - ax - b), \| \|_\lambda^2$$

is a robust kernel function; x, y are coordinate information of the candidate point cloud in an x-y plane of the rotation center coordinate system, and $\alpha$ is a predetermined regular penalty factor.

13. The vehicle of claim 8, wherein the apparatus for trailer angle measurement is configured to determining the trailer angle based on the boundary straight line of the trailer by:

determining the trailer angle based on a slope of the boundary straight line of the trailer in an x-y plane of the rotation center coordinate system.

14. The vehicle of claim 9, wherein the apparatus for trailer angle measurement is further configured to control, when it is determined to use the single-beam lidar for trailer angle measurement, the single-beam lidar to emit laser light and receive a laser point cloud reflected by the laser reflection plate; and calculate the trailer angle based on the laser point cloud received from the single-beam lidar.

15. A computing device, comprising a memory and one or more processors communicatively connected to the memory, wherein the memory stores instructions executable by the one or more processors, the instructions, when executed by the one or more processors, causing the one or more processors to perform a method comprising:

obtaining an initial trailer angle;

determining whether to use a single-beam lidar or a multiple-beam lidar for trailer angle measurement based on the initial trailer angle;

obtaining, when it is determined to use the multiple-beam lidar for trailer angle measurement, a deflection direction of a trailer, and collecting laser light emitted by the multiple-beam lidar on a side of the deflection direction and reflected by a surface of the trailer;

applying a coordinate transformation and selection process on a laser point cloud to form a candidate point cloud;

determining a boundary straight line of the trailer by means of optimized solution of the candidate point cloud based on a pre-constructed objective optimization function; and determining a trailer angle based on the boundary straight line of the trailer;

wherein said applying the coordinate transformation and selection process on the laser point cloud to form the candidate point cloud comprises:

transforming the laser point cloud from a coordinate system of the multiple-beam lidar to a rotation center coordinate system of a tractor and the trailer, to form point cloud data in the rotation center coordinate system;

region of interest (ROI) filtering the point cloud data in the rotation center coordinate system in accordance with a predetermined condition; and down-sampling the ROI-filtered point cloud data in the rotation center coordinate system to form the candidate point cloud.

16. The computing device of claim 15, wherein said determining whether to use the single-beam lidar or the multiple-beam lidar for trailer angle measurement based on the initial trailer angle comprises:

determining whether the initial trailer angle is greater than a predetermined angle threshold; and determining to use the multiple-beam lidar for trailer angle measurement when the initial trailer angle is greater than the predetermined angle threshold; or determining to use the single-beam lidar for trailer angle measurement when the initial trailer angle is smaller than or equal to the predetermined angle threshold.

17. The computing device of claim 15, wherein said transforming the laser point cloud from the coordinate system of the multiple-beam lidar to the rotation center coordinate system of the tractor and the trailer, to form the point cloud data in the rotation center coordinate system comprises:

transforming the laser point cloud in the coordinate system of the multiple-beam lidar, $$P=\{p_0, \ldots, p_i, \ldots, p_n\}, p_i \in \mathbb{R}^4, \mathbb{R}^4: x, y, z, i,$$

into the rotation center coordinate system of the tractor and the trailer according to:

$$p'_i = T_b^j T_l^b p_i = \begin{bmatrix} R_l^j & t_l^j \\ 0^T & 1 \end{bmatrix} p_i = R_l^j p_i + t_l^j,$$

to form the point cloud data in the rotation center coordinate system, $P'=\{p'_0, \ldots, p'_i, \ldots, p'_n\}$, where $\mathbb{R}^4$ represents a dimension of the laser point cloud, x, y, z represent three-dimensional coordinates of the laser point cloud, i represents a reflection intensity; $T_b^j$ is a transformation relationship from a coordinate system b of a vehicle body Inertial Measurement Unit (IMU) to a rotation center coordinate system j of the tractor and trailer, $T_l^b$ is a transformation relationship from a_coordinate system l of the multiple-beam lidar to the coordinate system b of the vehicle body IMU, $R_l^j$ represents a rotation matrix from the coordinate system l of the multiple-beam lidar to the rotation center coordinate system j of the tractor and trailer, and $t_l^j$ represents a translation matrix from the coordinate system l of the multiple-beam lidar to the rotation center coordinate system j of the tractor and trailer.

18. The computing device of claim 17, wherein said ROI-filtering the point cloud data in the rotation center coordinate system in accordance with the predetermined condition comprises:

selecting, from the point cloud data in the rotation center coordinate system, $P'=\{p'_0, \ldots, p'_i, \ldots, p'_n\}$, point cloud data that meets the predetermined condition, wherein the predetermined condition comprises:

in an x-y plane of the rotation center coordinate system, a distance between the point cloud and an origin of the rotation center coordinate system being smaller than a predetermined distance threshold $d_i$;

point cloud three-dimensional coordinates of the point cloud data in the rotation center coordinate system being within a predetermined three-dimensional coordinate range, the predetermined three-dimensional coordinate range being determined based on coordinates of three-dimensional model points of a vehicle body surface in the rotation center coordinate system and a trailer angle in a previous period; and a reflection intensity corresponding to the point cloud in the point cloud data in the rotation center coordinate system being greater than a predetermined reflection intensity threshold.

19. The computing device of claim 15, wherein said determining the boundary straight line of the trailer by means of optimized solution of the candidate point cloud based on the pre-constructed objective optimization function comprises:

determining the boundary straight line of the trailer by means of optimized solution of the candidate point cloud based on the pre-constructed objective optimization function:

$$\min_X \frac{1}{2} \|f(X)\|_\lambda^2$$

where X is an argument and X={a,b}, X={a,b} represents parameters a and b in the boundary straight line of the trailer to be determined, y=ax+b; $f(X)$ is a residual function and $$f(X) = f(a, b) = \left| \frac{ax + b - y}{\sqrt{a^2+1}} \right| + \alpha(y - ax - b), \| \|_\lambda^2$$

is a robust kernel function; x, y are coordinate information of the candidate point cloud in an x-y plane of the rotation center coordinate system, and $\alpha$ is a predetermined regular penalty factor.

20. The computing device of claim 15, wherein said determining the trailer angle based on the boundary straight line of the trailer comprises:

determining the trailer angle based on a slope of the boundary straight line of the trailer in an x-y plane of the rotation center coordinate system.

* * * * *